United States Patent
Huang et al.

(10) Patent No.: US 8,798,480 B2
(45) Date of Patent: Aug. 5, 2014

(54) HIGH-SPEED OPTICAL 8-QAM MODULATION BY CASCADING DUAL-DRIVE MACH-ZEHNDER MODULATOR WITH I/Q MODULATOR

(71) Applicant: NEC Laboratories America, Inc., Princeton, NJ (US)

(72) Inventors: Yue-Kai Huang, Princeton, NJ (US); Ezra Ip, Princeton, NJ (US); Dayou Qian, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 13/646,465

(22) Filed: Oct. 5, 2012

(65) Prior Publication Data
US 2013/0089340 A1    Apr. 11, 2013

Related U.S. Application Data

(60) Provisional application No. 61/543,360, filed on Oct. 5, 2011.

(51) Int. Cl.
*H04B 10/04* (2006.01)
*H04B 10/54* (2013.01)

(52) U.S. Cl.
CPC .................................. *H04B 10/541* (2013.01)
USPC ............ 398/186; 398/183; 398/185; 398/184

(58) Field of Classification Search
CPC ........... H04B 10/5051; H04B 10/5055; H04B 10/50597; H04B 10/50593; H04B 10/541; H04B 10/505; H04B 10/5161; H04L 27/36
USPC ........................................... 398/182–186, 188
See application file for complete search history.

(56) References Cited

U.S. PATENT DOCUMENTS

| | | | | |
|---|---|---|---|---|
| 5,301,058 | A * | 4/1994 | Olshansky | 398/194 |
| 6,262,834 | B1 * | 7/2001 | Nichols et al. | 359/301 |
| 6,961,166 | B2 * | 11/2005 | Wooten et al. | 359/245 |
| 7,346,283 | B2 * | 3/2008 | Kao et al. | 398/185 |
| 7,394,992 | B2 * | 7/2008 | Kimmitt et al. | 398/185 |
| 7,558,487 | B2 * | 7/2009 | Liu et al. | 398/185 |
| 8,155,534 | B2 * | 4/2012 | Winzer | 398/185 |
| 8,175,465 | B2 * | 5/2012 | Wang et al. | 398/168 |
| 8,358,936 | B2 * | 1/2013 | Yu et al. | 398/188 |
| 8,380,085 | B2 * | 2/2013 | Gupta et al. | 398/186 |

(Continued)

OTHER PUBLICATIONS

Transmission of 32-Tb/s Capacity Over 580 km Using RZ-Shaped PDM-8QAM Modulation Format and Cascaded Multimodulus Blind Equalization Algorithm Xiang Zhou et al. © Feb. 15, 2010.*

(Continued)

*Primary Examiner* — Daniel Washburn
*Assistant Examiner* — Hibret Woldekidan
(74) *Attorney, Agent, or Firm* — Joseph Kolodka

(57) ABSTRACT

Structures and methods of generating 8-QAM signals through the effect of a cascaded I/Q modulator and Mach-Zhender modulator. The 8-QAM signals are generated by applying one binary sequence to the dual-drive Mach-Zehnder modulator (MZM) and two binary sequences to the I/Q modulator. Operationally, the I/Q modulator generates QPSK constellation(s), while the dual drive MZM either maintains the QPSK constellation at an out ring, or attenuates its amplitude to the inner ring and rotates its phase by π/4 phase depending on the binary data it was driven by.

2 Claims, 1 Drawing Sheet

(56) References Cited

U.S. PATENT DOCUMENTS

| | | | | |
|---|---|---|---|---|
| 8,385,494 | B2* | 2/2013 | Fan et al. | 375/362 |
| 8,503,887 | B2* | 8/2013 | Kikuchi | 398/188 |
| 2004/0021829 | A1* | 2/2004 | Griffin | 353/30 |
| 2006/0008278 | A1* | 1/2006 | Kao et al. | 398/188 |
| 2006/0072924 | A1* | 4/2006 | Lee et al. | 398/183 |
| 2006/0159466 | A1* | 7/2006 | Kim et al. | 398/188 |
| 2011/0051215 | A1* | 3/2011 | Zhou | 359/238 |
| 2011/0109954 | A1* | 5/2011 | Zhou et al. | 359/279 |
| 2012/0321311 | A1* | 12/2012 | Zhang et al. | 398/65 |

OTHER PUBLICATIONS

Method to generate 112 Gbit/s polarisation-multiplexed 8QAM signal H.Y. Choi, T. Tsuritani and I. Morita © Apr. 26, 2012.*

32Tb/s (320114Gb/s) PDM-RZ-8QAM transmission over 580km of SMF-28 ultra-low-loss fiber. Xiang Zhou et al. © 2009.*

Multi-Level, Multi-Dimensional Coding for High-Speed and High-Spectral-Efficiency Optical Transmission. Xiang Zhou et al. © Aug. 15, 2009.*

* cited by examiner

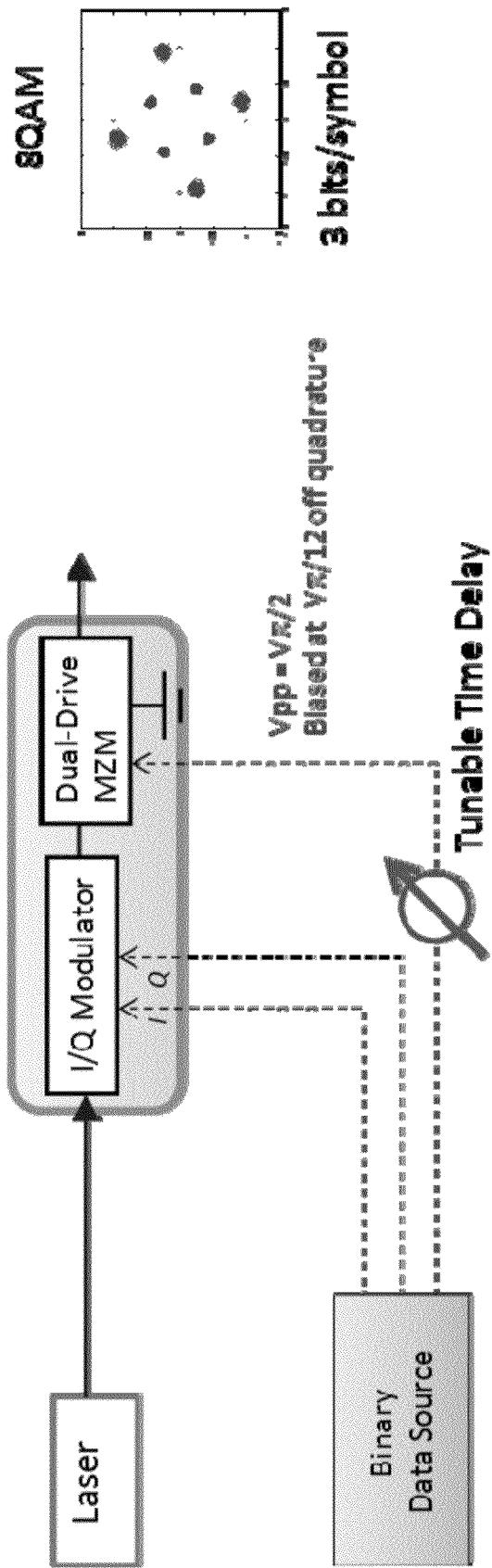

HIGH-SPEED OPTICAL 8-QAM MODULATION BY CASCADING DUAL-DRIVE MACH-ZEHNDER MODULATOR WITH I/Q MODULATOR

TECHNICAL FIELD

This disclosure relates generally to the field of optical communications and in particular to high speed optical 8-quadrature amplitude modulation (8-QAM) produced by cascading dual-drive mach-zehnder modulator with an I/Q modulator.

BACKGROUND

As 100-Gb/s transponders become available for deployment, network operators are able to increase the capacity per link due—in part—to the improved spectral efficiency of 100 Gb/s channels. As is known, the current spectral efficiency for dual-polarization quadrature phase shift keying (DP-QPSK) with fixed 50-GHz spacing is ~2 b/s/Hz.

One way to increase this efficiency is to change the format to one with denser constellation. However, the OSNR requirements for high-order QAM such as 16-QAM or 32-QAM is so high that it is difficult to transmit over 1,000-km with regular 80-km span SSMFs with EDFA-only amplification. Advantageously, through the effect of DP-8QAM modulation, one can increase the efficiency from 4-bits per symbol for DP-QPSK to 6-bits per symbol thereby improving the spectral efficiency by 50% under the symbol rate while maintaining the reach above 1,500 km or more. However 8-QAM signaling involves more complicated constellation generation compare to QPSK and 16-QAM and has proven extremely difficult to implement with digital-to-analog-converters. (DAC).

Prior art attempts at QAM modulation include the use of digital to analog converters (DACs) to generate the multi-level signals for optical QAM modulation. (See, e.g., United States Patent Application Publication No. US2009/01966021A1 "Adjustable Bit Rate Optical Transmission Using Programmable Signal"). Therein, the signal used to drive I and Q ports of an optical I/Q modulator is obtained by mapping an 8-QAM constellation to real and imaginary axis and converted to an analog signal. Notwithstanding such contributions, contemporary high-speed DACs generally do not operate beyond ~10 GHz bandwidth and therefore such approaches are impractical at best for implementing line rates above 100 Gb/s.

SUMMARY

An advance in the art is made according to an aspect of the present disclosure directed to structures and methods of generating 8-QAM signals through the effect of a cascaded I/Q modulator and Mach-Zhender modulator. The 8-QAM signals are generated by applying one binary sequence to the dual-drive Mach-Zehnder modulator (MZM) and two binary sequences to the I/Q modulator. Operationally, the I/Q modulator generates QPSK constellation(s), while the dual drive MZM either maintains the QPSK constellation at an out ring, or attenuates its amplitude to the inner ring and rotates its phase by $\pi/4$ phase depending on the binary data it was driven by. Consequently, an 8-QAM constellation is generated.

Advantageously, by only using three binary sequences as signal sources, we generate 8-QAM at speeds much faster than those otherwise available in the art. More particularly, and depending upon the speed of the binary pattern generation—which can be as high as 56 Gbaud/sec—it may be more than two times higher than the fastest contemporary DAC. Still further, devices constructed according to the present disclosure utilize 100 G components thereby minimizing the overall cost. Finally, enhanced operation is realized as the I/Q modulator for QPSK modulation may be monitored using conventional biasing methods, while the amplitude difference generated by the dual-drive MZM may be easily observed and tuned.

BRIEF DESCRIPTION OF THE DRAWING

A more complete understanding of the present disclosure may be realized by reference to the accompanying drawings in which:

FIG. 1(a) is a schematic block diagram depicting an exemplary structure according to an aspect of the present disclosure.

DETAILED DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

Turning now to FIG. 1(a), there is shown a schematic block diagram of a exemplary arrangement for high speed 8-QAM generation. As may be observed from that FIGURE, such an arrangement includes cascaded I/Q modulator and dual-drive Mach-Zehnder modulator, a laser, a binary data source and tunable time delay. An output signal from the laser is received by the I/Q modulator which is driven by the binary data source at its I/Q inputs. The laser is thereby modulated by the I/Q modulator driven by the two binary sequences thereby generating a QPSK constellation as may be implemented in a 40 G DQPSK or 100 G DP-QPSK system, for example. The MZM is driven by a third binary sequence while the other port is grounded. When operated according to the present disclosure, an 8-QAM output is realized.

More specifically, and as those skilled in the art will appreciate, a dual-drive MZM such as that shown in FIG. 1(a) is conventionally designed for intensity modulation only with reduced $V_\pi$, i.e., voltage swing required to drive MZM between mass and null. In an arrangement according to the present disclosure, one port of the MZM is grounded while the other port is driven by a third binary sequence.

Assuming that 0 and 1 are represented by drive voltages $V_1$ and $V_2$ to the dual drive MZM, we have the following relations $$\frac{1}{2}\cos\left(\pi\frac{v_1}{v_\pi}\right) + \frac{1}{2}i\cdot\left(1+\sin\left(\pi\cdot\frac{v_1}{v_\pi}\right)\right) = A\cdot e^{i\theta}$$

$$\frac{1}{2}\cos\left(\pi\frac{v_1}{v_\pi}\right) + \frac{1}{2}i\cdot\left(1+\sin\left(\pi\cdot\frac{v_1}{v_\pi}\right)\right) = \frac{\sqrt{2}}{1+\sqrt{3}}A\cdot e^{i(\theta+\frac{\pi}{4})}$$

where $$\frac{\sqrt{2}}{1+\sqrt{3}}$$

is the amplitude ratio between the inner ring and outer ring of the 8_QAM constellation.

Solving for $V_1$ and $V_2$ we obtain:

$$V_1 = \frac{2}{3}V_\pi + 2n\cdot V_\pi$$

$$V_2 = \frac{7}{6}V_\pi + 2n\cdot V_\pi$$

Operationally, this means that the drive voltage, or difference between $V_1$ and $V_2$ should be $V_\pi/2$ for initializing. This may be easily performed by driving the MZM to $V_\pi$ first by checking the on-off keying eye diagram and then adding a 3 dB RF attenuator to the driving path. Once the drive voltage is set, one can then observe the eye diagram of the modulator output and tune the ratio between the intensity of the two levels to:

$$\frac{(1+\sqrt{3})^2}{2} \sim 3.73,$$

which is the square of the amplitude ratio between the outer ring to the inner ring.

Once the bias has be set, the dual-drive MZM can then be cascaded with the I/Q modulator which has already generated the QPSK constellation. The tunable time delay—advantageously implemented either electrically or optically—is tuned such that the symbols from the two modulators are aligned, and an 8-QAM constellation exhibiting 3-bits/symbol is obtained.

As may be appreciated by those skilled in the art, the use of a dual-drive MZM for both amplitude and phase modulation is an advantageous aspect of apparatus and methods according to the present disclosure. It is advantageously used to manipulate the signal such that it produces the relative amplitude attenuation and phase rotation necessary to generate the 8-QAM signal from an input QPSK constellation.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in Appendix A to the application. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method for producing an 8-quadrature amplitude modulation (8-QAM) signal comprising:
   receiving an optical signal by a cascaded dual-drive Mach-Zehnder modulator (MZM) assembly including an in-phase/quadrature (I/Q) modulator in series with a dual-drive Mach-Zehnder modulator, said assembly configured such that upon receipt of the optical signal an 8-QAM signal is output;
   outputting the 8-QAM optical signal;
   applying to I/Q inputs of the I/Q modulator binary data output from a binary data source; and
   configuring the dual-drive Mach-Zehnder modulator such that one input of the MZM is grounded while the other input is set to $V_{pp}=V_{\pi/2}$ and biased at $V_{\pi/12}$ off quadrature, wherein V is a drive voltage, $V_{pp}$ is a peak to peak voltage.

2. An apparatus for producing an 8-quadrature amplitude modulation (8-QAM) signal comprising:
   a cascaded dual-drive Mach-Zehnder modulator (MZM) assembly including an in-phase/quadrature (I/Q) modulator in series with a dual-drive Mach-Zehnder modulator, said assembly configured such that upon receipt of an input optical signal the 8-QAM signal is output;
   a binary data source for providing I/Q inputs to the I/Q modulator;
   wherein said dual-drive Mach-Zehnder modulator is configured such that one input of the MZM is grounded while the other input is set to $V_{pp}=V_{\pi/2}$ and biased at $V_{\pi/12}$ off quadrature, wherein V is a drive voltage, $V_{pp}$ is a peak to peak voltage.

* * * * *